(12) United States Patent
Yang et al.

(10) Patent No.: US 9,535,291 B2
(45) Date of Patent: Jan. 3, 2017

(54) PSVA LCD PANEL AND METHOD FOR MANUFACTURING THE PSVA LCD PANEL

(71) Applicant: SHENZHEN CHINA STAR OPTOELECTRONICS TECHNOLOGY CO., LTD, Shenzhen (CN)

(72) Inventors: Kunchang Yang, Shenzhen (CN); Liang Xu, Shenzhen (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 406 days.

(21) Appl. No.: 14/233,774

(22) PCT Filed: Oct. 22, 2013

(86) PCT No.: PCT/CN2013/085632
§ 371 (c)(1),
(2) Date: Jan. 20, 2014

(87) PCT Pub. No.: WO2015/043027
PCT Pub. Date: Apr. 2, 2015

(65) Prior Publication Data
US 2015/0085226 A1    Mar. 26, 2015

(30) Foreign Application Priority Data
Sep. 24, 2013   (CN) .......................... 2013 1 0438631

(51) Int. Cl.
G02F 1/1337    (2006.01)

(52) U.S. Cl.
CPC ... *G02F 1/133788* (2013.01); *G02F 1/133711* (2013.01); *G02F 2001/133715* (2013.01)

(58) Field of Classification Search
CPC ................... G02F 1/133788; G02F 1/133711; G02F 2001/133715
See application file for complete search history.

(56) References Cited

U.S. PATENT DOCUMENTS

| | | | |
|---|---|---|---|
| 9,366,906 B2 * | 6/2016 | Lincker | C09K 19/56 |
| 2008/0266503 A1 * | 10/2008 | Lyu | G02F 1/133707 349/124 |

(Continued)

FOREIGN PATENT DOCUMENTS

| | | |
|---|---|---|
| CN | TW200931138 A | 7/2009 |
| CN | 102122100 A | 7/2011 |

(Continued)

OTHER PUBLICATIONS

Liu Jun, the International Searching Authority written comments, Jul. 2014, CN.

*Primary Examiner* — Mark A Osele
*Assistant Examiner* — Christopher C Caillouet

(57) ABSTRACT

A method for manufacturing a polymer sustained vertical alignment (PSVA) liquid crystal displays (LCD) panel includes: A: layering an alignment film on a substrate; B: forming an active reactive monomer layer on a surface of the alignment film; C: coating a liquid crystal layer on a surface of the active reactive monomer layer; and D: sealing the LC layer, and performing optical alignment on LC molecules of the LC layer.

7 Claims, 5 Drawing Sheets

(56) References Cited

U.S. PATENT DOCUMENTS

2009/0311441 A1* 12/2009 Bae .................. G02B 5/1876
427/554
2012/0021141 A1* 1/2012 Yoo .................. C09K 19/38
428/1.2

FOREIGN PATENT DOCUMENTS

| CN | 102224450 A | 10/2011 |
| CN | 102566158 A | 7/2012 |
| TW | 201005394 A | 2/2010 |
| TW | 201015176 A | 4/2010 |
| WO | WO2012086718 A | 6/2012 |
| WO | WO2013103153 A | 7/2013 |

* cited by examiner

PSVA LCD PANEL AND METHOD FOR MANUFACTURING THE PSVA LCD PANEL

TECHNICAL FIELD

The present disclosure relates to the field of liquid crystal displays (LCDs), and more particularly to a polymer sustained vertical alignment (PSVA) LCD panel and a method for manufacturing the PSVA LCD panel.

BACKGROUND

Today, users have higher demand requirements for display devices. To satisfy such requirements, some flat panel display devices have been rapidly developed in recent years, such as liquid crystal display (LCD) device, Plasma Display Panel (PDP), and Organic Light-Emitting Diode (OLED) display device. In flat panel display devices, LCD devices are gradually replacing cold cathode display devices due to low weight, small volume, and low energy consumption.

An initial LCD mode has a low contrast ratio and a poor viewing angle, such as a twisted nematic (TN) display and a super twisted nematic (STN) display. With the growth of living standards, users demand improved display devices. Thus, some LCD modes having a wide visual angle have developed rapidly in recent years, such as an in-plan switching (IPS) display and a vertical alignment (VA) display.

For the VA display, the LCD device includes a first substrate, a second substrate, and negative liquid crystal (LC) molecules between the first substrate and the second substrate. Transparent conducting layers (indium tin oxide: ITO) are layered on insides of the first substrate and the second substrate, which forms a vertical electric field. The negative LC molecules are embedded between two transparent conducting layers. Dielectric constant of a long axis of the negative LC molecule is less than dielectric constant of a secondary axis of the negative LC molecule, where the secondary axis of the negative LC molecule is perpendicular to the long axis of the negative LC molecule. When the LC molecule is not affected by the vertical electric field, the LC molecule is perpendicular to surfaces of the first and second substrates. When the LC molecule is affected by the vertical electric field, the LC molecule is oriented toward a designated direction and finally arrays along a direction perpendicular to the vertical electric field because of small dielectric constant of the long axis of the LC molecule. Compared with the IPS display mode, the VA display mode has no friction process in a manufacturing process, which increases advantages of manufacturing the LCD device on a large-scale.

The initial VA mode is a multi-domain vertical alignment (MVA) mode, the MVA mode achieves a multi-domain display (generally, four domains) through forming a rib having a predetermined shape on a color film substrate, and the MVA mode improves the viewing angle of the VA mode. However, some defects are generated, the LC molecules in a determined range surrounding the rib have a poor vertical orientation due to the rib on the color film substrate, thus, light leak exists, which affects the contrast ratio of the MVA mode.

With the development of the technology, the MVA technology is improved, and a patterned vertical alignment (PVA) mode is generated. In the PVA mode, a corresponding ITO pattern is formed on a transparent electrode (ITO) of the color film substrate, and the rib is not formed. The pattern may be an ITO slit, and a width of the ITO slit is usually between 8-15 um. The PVA technology does not need to form the rib, and sharply reduces the light leak.

However, other defects are generated in the MAV mode and the PVA mode, transmittances of the rib of the MAV mode and the ITO slit of the PVA mode are far less than transmittance of a normal pixel region, which affects an entire transmittance of the device.

In view of the above-described problems, a new VA mode is generated, and the rib and the ITO slit are not formed on the color film substrate 21 of the new VA mode, which reduces manufacturing cost of the color film and improves the entire transmittance of the device. As shown in FIG. 1A to FIG. 1C, the new VA mode is named as a polymer sustained vertical alignment (PSVA) mode. The color film of the PSVA mode is not only different from the MVA mode and the PVA mode, but also the LC molecule and the pattern of the transparent electrode of the substrate of the PSVA are different from the MVA mode and the PVA mode. In the PSVA mode, a reactive monomer 40 is added into original negative LC molecules 30, and the reactive monomers 40 perform a reaction according to a determined law under an external influence. The width of the transparent electrode 10 and transparent electrode slit 11 are small on transparent electrode pattern of the array substrate 22.

In a manufacturing process of an LCD panel, some LC molecules are remained in an LC bottle. The residual LC molecules should be recycled, purified, and reused, which reduces manufacturing cost. However, the reactive monomer having high-activity is directly added into the LC molecules of the PSVA mode, concentration of the reactive monomer is not easy to manage and the reactive monomer can perform the reaction, thus the LC molecule of the PSVA mode cannot be purified and reused.

SUMMARY

In view of the above-described problems, the aim of the present disclosure is to provide a polymer sustained vertical alignment (PSVA) liquid crystal display (LCD) panel, and a method for manufacturing the PSVA LCD panel capable of recycling and reusing a liquid crystal molecule.

The aim of the present disclosure is achieved by the following methods.

A method for manufacturing a polymer sustained vertical alignment (PSVA) liquid crystal displays (LCD) panel comprises:
  A: layering an alignment film on a substrate;
  B: forming an active reactive monomer layer on a surface of the alignment film;
  C: coating a liquid crystal layer on a surface of the active reactive monomer layer; and
  D: sealing the LC layer, and performing optical alignment on LC molecules of the LC layer.

Furthermore, the step B comprises: adding an active reactive monomer of the active reactive monomer layer into a solvent, coating the solvent comprising the active reactive monomer on the surface of the alignment film by a spraying method, and performing vacuum drying. In the present disclosure, the active reactive monomers are added into the solvent, and the solvent comprising the active reactive monomers is evenly coated on the surface of the substrate because of a fluid characteristic of the solvent. After the solvent is removed through the vacuum drying, the active reactive monomers are remained and evenly laid on the surface of the substrate. Thus, the active reactive monomers can be evenly laid on the surface of the substrate through the solvent, which reduces cost and improves efficiency. It should be considered that the active reactive monomers can be evenly laid on the surface of the substrate through directly coating the active reactive monomers on the surface of the substrate.

Furthermore, the solvent comprises any one or two of phenyl-cyclohexane and n-butylbenzene. The solvent should satisfied requirements as follow:
1) not reacting under an ultraviolet light (few of solvent remain in the PSVA LCD panel).
2) generating small pollution to the LC molecules, and using the solvent that is similar with the LC molecule.
3) having good heat stability and high flash point, and not being flammable and explosive.
4) having good wettability for solidified polyimide (PI), and easily dispersing.
5) having poor solubility and swelling property for the solidified PI, and not damaging the solidified PI.
6) having low conductivity.
7) having low surface tension.
8) having good solubility for the active reactive monomer.
9) having low toxicity.
10) having a suitable boiling point. A: the boiling point of the solvent is greatly different from the active reactive monomer, and the solvent is easily removed by thermal evaporation. B: the boiling point of the solvent is not too low, which avoids completely volatilizing during the spraying. According to the above-mentioned requirements, inventors find the solvent can be any one or two of the phenyl-cyclohexane and the n-butylbenzene through experiment.

Furthermore, a range of concentration of the solvent is 50 ppm-5000 ppm.

Furthermore, a size of droplet formed by the spraying method is less than 1 um.

Furthermore, the step B further comprises: checking a spraying result after coating the solvent comprising the active reactive monomer on the surface of the alignment film by the spraying method. If spraying uniformity is less than a preset threshold value, the substrate is cleaned and the solvent comprising the active reactive monomer is sprayed on the substrate until the spraying uniformity reaches the preset threshold value, and the vacuum drying is performed.

Furthermore, a position of a nozzle of a spraying device deviates from just above the substrate.

Furthermore, an atmospheric pressure of the vacuum drying is in a range of 1 kPa-10 kPa, temperature of the vacuum drying is in a range of 40° C.-601° C., and time of the vacuum drying is in a range of 300 s-1800 s.

Furthermore, an active reactive monomer of the active reactive monomer layer is benzyl cinnamate.

Furthermore, a number of the substrate is two. The step A comprises: coating the alignment film on first surfaces of the two substrates, and then thermally solidifying the alignment films, where the first surfaces of the two substrates are arranged face to face.

The step B comprises:
B1: coating frame glue on an edge of a display area of the first surface of any one of substrates;
B2: spraying a solvent comprising an active reactive monomer of the active reactive monomer layer on the first surface of any one or two of substrates; and
B3: drying the substrate having the solvent comprising the active reactive monomer in a vacuum;

The step C comprises: coating the LC layer on the first surface of any one or two of substrates by an LC one drop fill (ODF) process.

The step D comprises:
D1: attaching two substrates in the vacuum;
D2: thermally solidifying the frame glue;
D3: performing an alignment of the active reactive monomer by using the ultraviolet light; and
D4: cutting the substrates and forming the LCD panel.

A polymer sustained vertical alignment (PSVA) liquid crystal displays (LCD) panel comprises a substrate. An alignment film, an active reactive monomer layer, and a liquid crystal (LC) layer are successively arranged on a surface of the substrate, where only LC molecules are arranged in the liquid crystal layer.

The method for manufacturing the PSVA LCD panel of the present disclosure comprises layering the active reactive monomer layer on the surface of the alignment film, coating the LC layer on the surface of the active reactive monomer layer, and performing the optical alignment on the LC molecules. The active reactive monomer does not need to be added into the LC molecules, thus the LC molecules in an LC bottle can be recycled and reused. However, a reactive monomer having high-activity is added into the LC molecules of a typical PSVA LCD panel, which requires some special precautions to be taken for the LC molecules of the typical PSVA LCD panel in transportation, storage, and use. Thus, process complexity of the typical PSVA LCD panel is increased. The PSVA LCD panel and the method for manufacturing the PSVA LCD panel of the present disclosure avoid the above-mentioned problem.

DETAILED DESCRIPTION

Figure 1A:
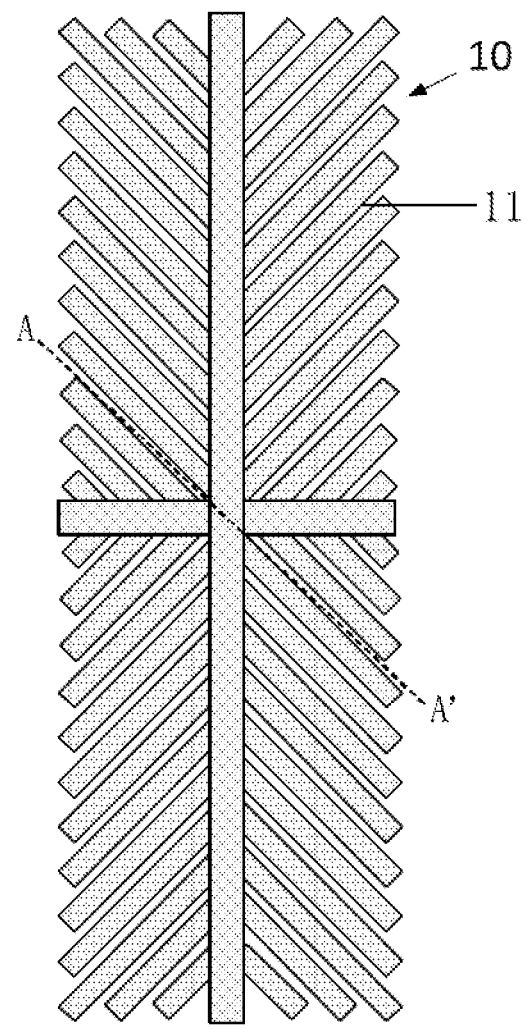
FIG. 1A is a schematic diagram of a transparent electrode of a polymer sustained vertical alignment (PSVA) liquid crystal display (LCD) panel.
Figure 1B:
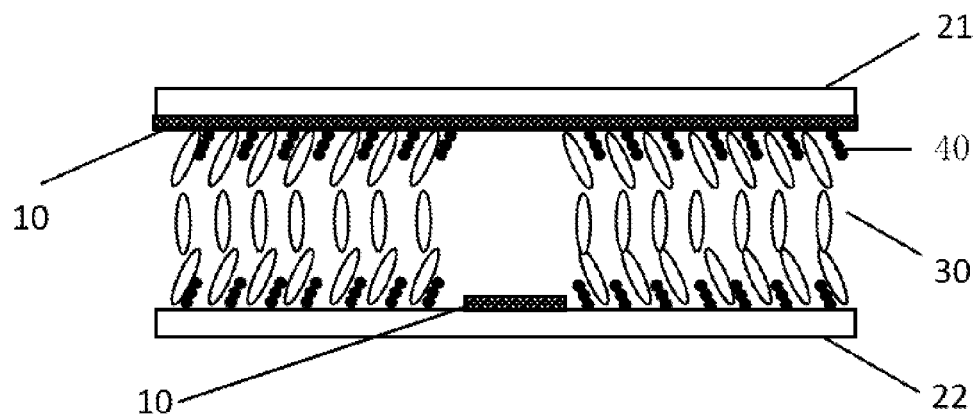
FIG. 1B is a cross-sectional view along the line A-A' in FIG. 1A without an electric field.
Figure 1C:
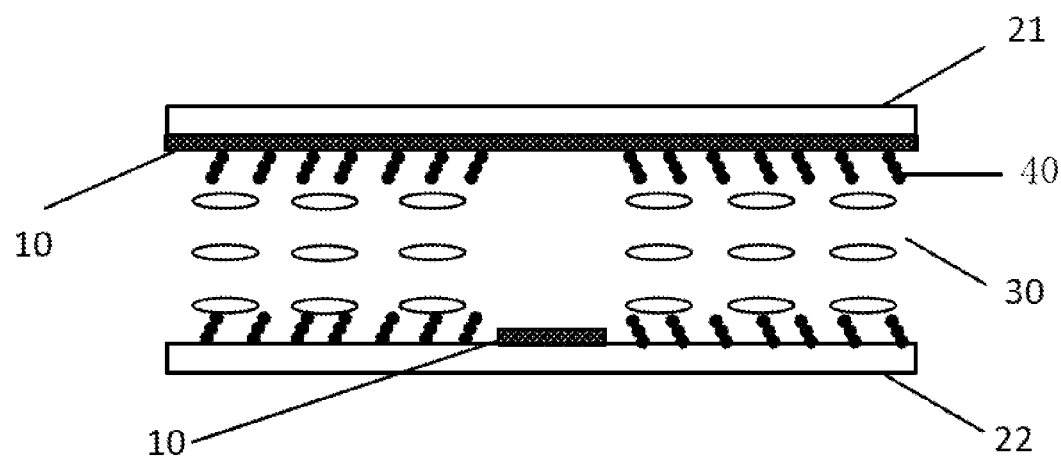
FIG. 1C is a cross-sectional view along the line A-A' in FIG. 1A under an electric field.
Figure 2:
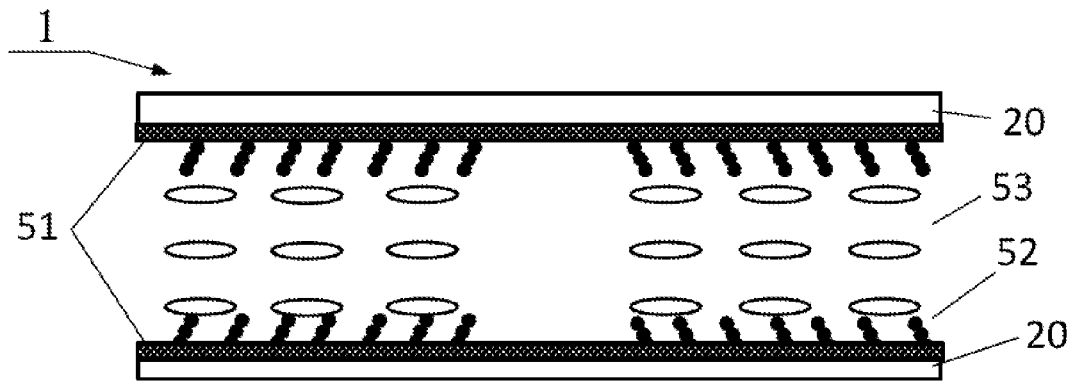
FIG. 2 is a flowchart of a method for manufacturing a PSVA LCD panel of the present disclosure.

As shown in FIG. 2, the present disclosure provides a method for manufacturing a polymer sustained vertical alignment (PSVA) liquid crystal displays (LCD) panel, the method comprises:
A: layering an alignment film 51 on a substrate 20;
B: forming an active reactive monomer layer 52 on a surface of the alignment film 51;
C: coating a liquid crystal (LC) layer 53 on a surface of the active reactive monomer layer 52; and
D: sealing the LC layer 53, and performing optical alignment on LC molecules of the LC layer 53.

Figure 3:
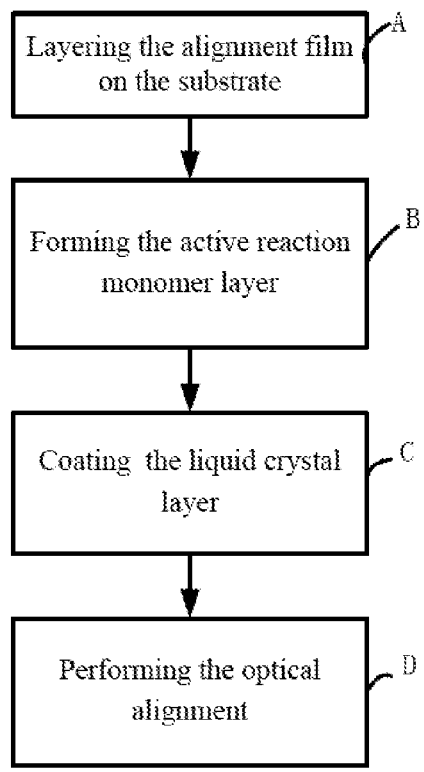
FIG. 3 is a schematic diagram of a pixel structure of a PSVA LCD panel of the present disclosure.

As shown in FIG. 3, the present disclosure provides a PSVA LCD panel comprising the substrate 20. The alignment film 51, the active reactive monomer layer 52, and the liquid crystal layer 53 are successively arranged on a surface of the substrate 20, where only LC molecules are arranged in the liquid crystal layer 53.

The method for manufacturing the PSVA LCD panel of the present disclosure comprises layering the active reactive monomer layer 52 on the surface of the alignment film 51, coating the LC layer 53 on the surface of the active reactive monomer layer 52, and performing the optical alignment on the LC molecules. The active reactive monomer does not need to be added into the LC molecules, thus the LC molecules in an LC bottle can be recycled and reused. However, a reactive monomer having high-activity is added into the LC molecules of a typical PSVA LCD panel, which requires some special precautions to be taken for the LC molecules of the typical PSVA LCD panel in transportation, storage, and use. Thus, process complexity of the typical PSVA LCD panel is increased. The PSVA LCD panel and the method for manufacturing the PSVA LCD panel of the present disclosure avoid the above-mentioned problem.

The present disclosure will further be described in detail in accordance with the figures and the exemplary examples.

EXAMPLE 1

Figure 4:
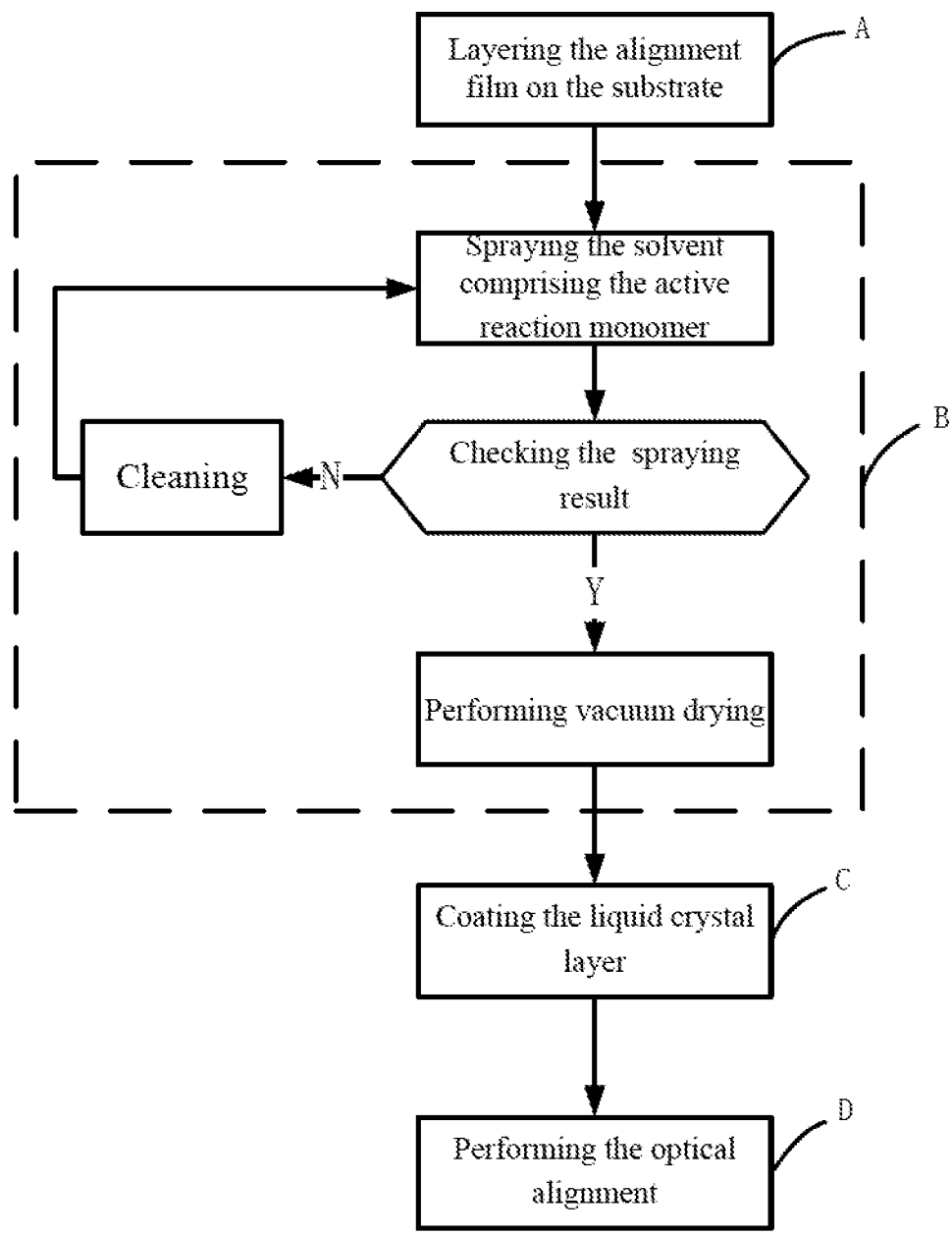
FIG. 4 is a flowchart of a method for manufacturing a PSVA LCD panel of a first example of the present disclosure.

As shown in FIG. 4, the method for manufacturing the PSVA LCD panel comprises:
  A: layering the alignment film 51 on the substrate 20;
  B: forming the active reactive monomer layer 52 on the surface of the alignment film 51;
  C: coating the LC layer 53 on the surface of the active reactive monomer layer 52; and
  D: sealing the LC layer 53, and performing optical alignment on the LC molecules of the LC layer 53.

The step B comprises: putting a solvent protecting the active reactive monomer into a spraying device, coating the solvent on the surface of the alignment film 52 by a spraying method, checking a spraying result, and performing vacuum drying. The active reactive monomer is added into the solvent. In the step of checking the spraying result, if spraying uniformity does not reach a preset threshold value, the substrate is cleaned and the solvent comprising the active reactive monomer is sprayed until the spraying uniformity reaches the preset threshold value, and the vacuum drying is performed. In the step of cleaning the substrate, two cleaning agents are used, a first cleaning agent is pure water mixed with a surfactant, and a second cleaning agent is the pure water, where the second cleaning agent is used after using the first cleaning agent. The solvent protecting the active reactive monomer may be phenyl-cyclohexane

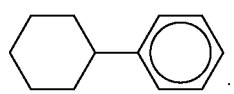

The phenyl-cyclohexane is a combination of a functional group used frequently in an LC monomer, and doping capacity of the phenyl-cyclohexane to the LC molecule is smaller than other substances. A boiling point of the phenyl-cyclohexane is 273° C. in a normal pressure, which is not too high and too low. A melting point of the phenyl-cyclohexane is 7.5° C., a flash point of the phenyl-cyclohexane is 98.9° C., and the flash point is high. A conductivity of the phenyl-cyclohexane is 8.85E-10, and a surface tension of the phenyl-cyclohexane is 34.5E-5 N/m. Thus, the phenyl-cyclohexane is suitable for the solvent protecting the active reactive monomer of the present disclosure. It should be considered that the solvent protecting the active reactive monomer also may be n-butylbenzene

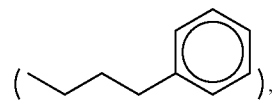

or a mixture of the n-butylbenzene and the phenyl-cyclohexane.

In fact, as long as the solvent satisfies requirements as follows, the solvent may be used as the solvent that protects the active reactive monomer of the present disclosure:
  1) not performing a reaction under an ultraviolet light (a few of solvent are remained in the PSVA LCD panel).
  2) generating small pollution to the LC molecules, and using the solvent that is similar with the LC molecule.
  3) having good heat stability and high flash point, and not being flammable and explosive.
  4) having good wettability for solidified polyimide (PI), and easily dispersing.
  5) having poor solubility and swelling property for the solidified PI, and not damaging the solidified PI.
  6) having low conductivity.
  7) having low surface tension.
  8) having good solubility for the active reactive monomer.
  9) having low toxicity.
  10) having a suitable boiling point, which is greatly different from the active reactive monomer, and being easily removed by a thermal evaporation. The boiling point of the solvent cannot be too low, which avoids completely volatilizing during the spraying.

A range of a concentration of the solvent is 50 ppm-5000 ppm, an exemplary concentration of the solvent is about 1000 ppm. A size of droplet formed by the spraying method is less than 1 um. A position of a nozzle of the spraying device deviates from just above the substrate (namely the nozzle of the spraying device is not directly positioned over the substrate). An inner wall of the spraying device should be cleaned at regular intervals.

An atmospheric pressure of the vacuum drying is in a range of 1 kPa-10 kPa, temperature of the vacuum drying is in a range of 40° C.-60° C., and time of the vacuum drying is in a range of 300 s-1800 s. The boiling point of the solvent used in the present disclosure is suitable, thus, the atmospheric pressure of the vacuum drying does not need be reduced at different stages of the vacuum drying. It should be considered that the atmospheric pressure of the vacuum drying can be reduced at different stages of the vacuum drying if needed.

In one example, the atmospheric pressure of the vacuum drying is 2.93 kPa, the temperature of the vacuum drying is 50° C., and the time of the vacuum drying is in the range of 300 s,-1800 s. The boiling point of the solvent used in the present disclosure is suitable, thus, the atmospheric pressure of the vacuum drying does not need be reduced at different stages of the vacuum drying. It should be considered that the atmospheric pressure of the vacuum drying can be reduced at different stages of the vacuum drying if needed.

The active reactive monomer is benzyl cinnamate:

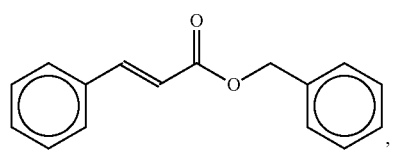

it also can be other substances, such as

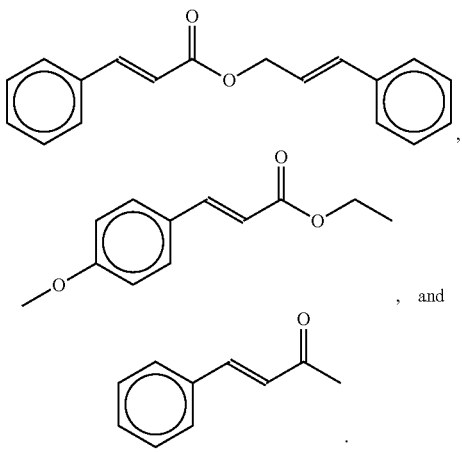

, and

The active reactive monomer used in the present disclosure satisfies requirements as follows:

1) performing a polymerization conducted by free radical under the ultraviolet light.
2) having high boiling point and not easily volatilizing at a determined temperature.
3) not easily performing a polymerization under thermal effect.
4) having good solubility and being easily dissolved in the solvent and the LC molecules.
5) having low toxicity.
6) having good adhesiveness with the PI.
7) having melting point being slightly greater than room temperature.

It should be understood that the active reactive monomer is not limited to one substance, and can be a mixture.

In the present disclosure, the active reactive monomers are added into the solvent, and the solvent comprising the active reactive monomers is evenly coated on the surface of the substrate because of a fluid characteristic of the solvent. After the solvent is removed through the vacuum drying, the active reactive monomers are remained and evenly laid on the surface of the substrate. Thus, the active reactive monomers can be evenly laid on the surface of the substrate through the solvent, which reduces cost and improves efficiency. It should be considered that the active reactive monomers can be evenly laid on the surface of the substrate through directly coating the active reactive monomers on the surface of the substrate.

EXAMPLE 2

Figure 5:
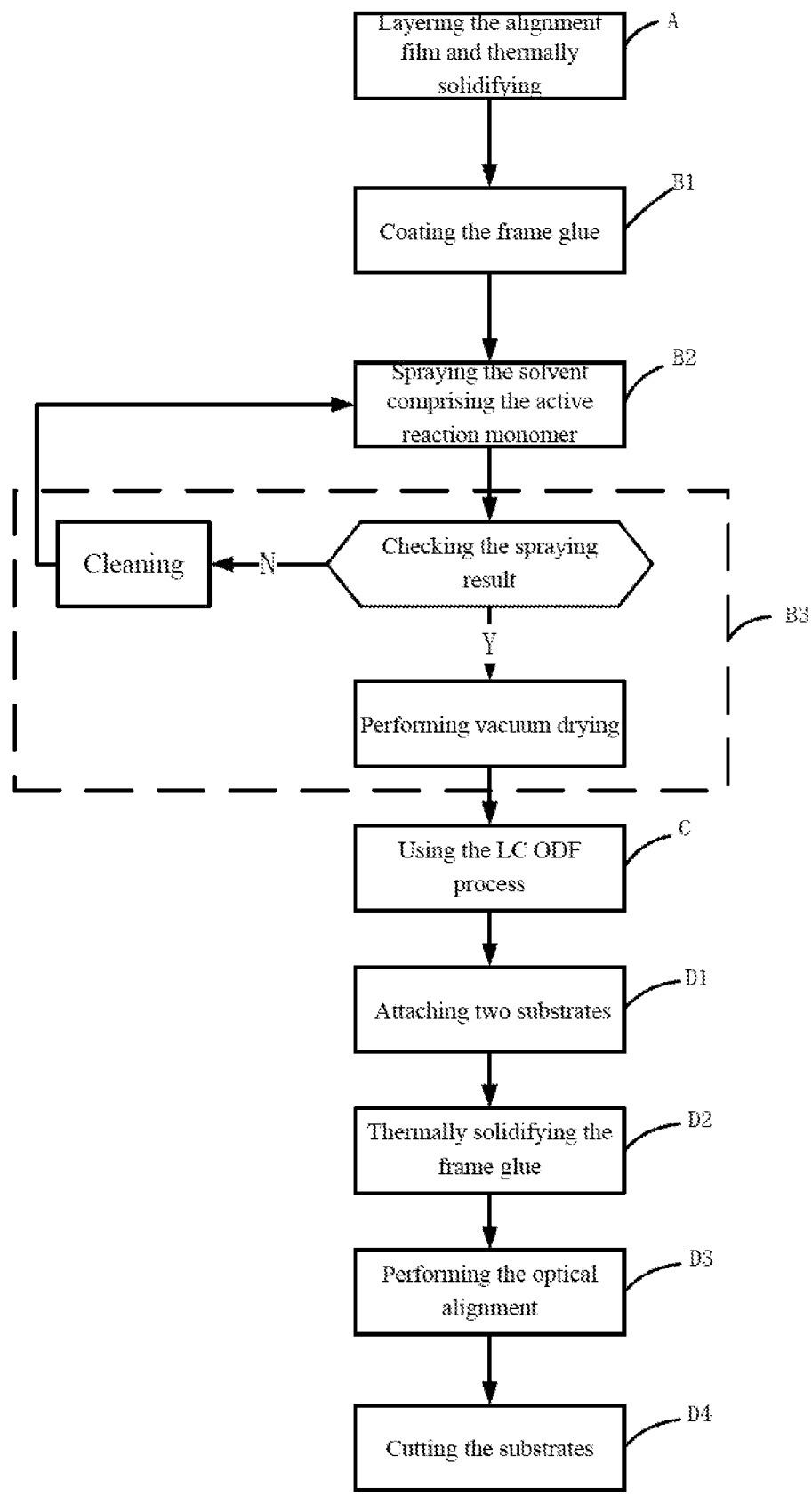
FIG. 5 is a flowchart of a method for manufacturing a PSVA LCD panel of a second example of the present disclosure.

As shown in FIG. 5, a second example will further be described in detail at a basis of the first example. The substrate 20 of the LCD panel comprises an array substrate 21 and a color substrate 22. The step A comprises: coating the alignment film 51 on a first surface of the array substrate 21 and a first surface the color substrate 22, and solidifying the alignment film 51 through heat, where the first surface of the array substrate 21 and the first surface the color substrate 22 are arranged face to face.

The step B comprises:
B1: coating frame glue on an edge of a display area of the first surface of any one of substrates 20;
B2: spraying the solvent comprising the active reactive monomer on the first surface of any one or two of the substrates 20; and
B3: checking spraying result, if spraying uniformity does not reach the preset threshold value, the substrate is cleaned and the solvent comprising the active reactive monomer is sprayed until the spraying uniformity reaches the preset threshold value, and the vacuum drying is performed.

The step C comprises: coating the liquid crystal layer 53 on the first surface of any one of substrates 20 by an LC one drop filling (ODF) process.

The step D comprises:
D1: attaching two substrates in a vacuum,
D2: thermally solidifying the frame glue;
D3: performing an alignment of the active reactive monomer by using the ultraviolet light; and
D4: cutting the substrate and forming the LCD panel.

According to an entire production process, the method for manufacturing the PSVA LCD panel has some kinds of the methods as follows:

Production Process 1:
Cleaning the substrate—⟩coating the alignment film—⟩thermally solidifying the alignment film—⟩coating the frame glue on an edge of the color film substrate—⟩spraying the active reactive monomer on the array substrate—⟩checking the spraying result—⟩if spraying uniformity does not reach the preset threshold value, the array substrate is cleaned and the active reactive monomer is sprayed on the array substrate until the spraying uniformity reaches the preset threshold value, and drying the array substrate in the vacuum—⟩using the LC ODF process for the color film substrate—⟩attaching the two substrates in the vacuum—⟩solidifying the frame glue by ultraviolet—⟩thermally solidifying the frame glue—⟩performing the optical alignment on the LC molecules—⟩cutting the PSVA LCD panel—⟩attaching a polarizer to a surface of the PSVA LCD panel, and the like.

Production process 2:
Cleaning the substrate—⟩coating the alignment film—⟩thermally solidifying the alignment film—⟩coating the frame glue on an edge of the array substrate—⟩spraying the active reactive monomer on the array substrate—⟩drying the array substrate in the vacuum—⟩using the LC ODF process for the color film substrate—⟩attaching the two substrates in the vacuum—⟩solidifying the frame glue by ultraviolet—⟩thermally solidifying the frame glue—⟩performing the optical alignment on the LC molecules—⟩cutting the PSVA LCD panel—⟩attaching the polarizer to the surface of the PSVA LCD panel, and the like.

Production Process 3:
Cleaning the substrate—⟩coating the alignment film—⟩thermally solidifying the alignment film—⟩coating the frame glue on the edge of the color film substrate—⟩spraying the active reactive monomer on the array substrate—⟩checking the spraying result—⟩if spraying uniformity does not reach the preset threshold value, the array substrate is cleaned and the active reactive monomer is sprayed on the array substrate until the spraying uniformity reaches the preset threshold value, and drying the array substrate in the vacuum—⟩using the LC ODF process for the array substrate—⟩attaching the two substrates in the vacuum—⟩solidifying the frame glue by ultraviolet—⟩thermally solidifying the frame glue—⟩performing the optical alignment on the LC molecules—⟩cutting the PSVA LCD panel—⟩attaching the polarizer to the surface of the PSVA LCD pane, and the like.

Production Process 4:

Cleaning the substrate—⟩coating the alignment film—⟩thermally solidifying the alignment film—⟩coating the frame glue on the edge of the array substrate—⟩spraying the active reactive monomer on the array substrate—⟩drying the array substrate in the vacuum—⟩using the LC ODF process for the array substrate—⟩attaching the two substrates in the vacuum—⟩solidifying the frame glue by ultraviolet—⟩thermally solidifying the frame glue—⟩performing the optical alignment on the LC molecules—⟩cutting the PSVA LCD panel—⟩attaching the polarizer to the surface of the PSVA LCD pane, and the like.

Production Process 5:

Cleaning the substrate—⟩coating the alignment film—⟩thermally solidifying the alignment film—⟩coating the frame glue on the edge of the color film substrate—⟩spraying the active reactive monomer on the array substrate and the color film substrate—⟩checking the spraying result of the array substrate—⟩if spraying uniformity does not reach the preset threshold value, the array substrate is cleaned and the active reactive monomer is sprayed on the array substrate until the spraying uniformity reaches the preset threshold value, and drying the array substrate and the color film substrate in the vacuum—⟩using the LC ODF process for the array substrate—⟩attaching the two substrates in the vacuum—⟩solidifying the frame glue by ultraviolet—⟩thermally solidifying the frame glue—⟩performing the optical alignment on the LC molecules—⟩cutting the PSVA LCD panel—⟩attaching the polarizer to the surface of the PSVA LCD pane, and the like.

Production Process 6:

Cleaning the substrate—⟩coating the alignment film—⟩thermally solidifying the alignment film—⟩coating the frame glue on the edge of the array substrate—⟩spraying the active reactive monomer on the array substrate and the color film substrate—⟩checking the spraying result of the color film substrate—⟩if spraying uniformity does not reach the preset threshold value, the color film substrate is cleaned and the active reactive monomer is sprayed on the color film substrate until the spraying uniformity reaches the preset threshold value, and drying the array substrate and the color film substrate in the vacuum—⟩using the LC ODF process for the array substrate—⟩attaching the two substrates in the vacuum—⟩solidifying the frame glue by ultraviolet—⟩thermally solidifying the frame glue—⟩performing the optical alignment on the LC molecules—⟩cutting the PSVA LCD panel—⟩attaching the polarizer to the surface of the PSVA LCD pane, and the like.

Production Process 7:

Cleaning the substrate—⟩coating the alignment film—⟩thermally solidifying the alignment film—⟩coating the frame glue on the edge of the color film substrate—⟩spraying the active reactive monomer on the array substrate and the color film substrate—⟩checking the spraying result of the array substrate—⟩if spraying uniformity does not reach the preset threshold value, the array substrate is cleaned and the solvent of the active reactive monomer is sprayed on the array substrate until the spraying uniformity reaches the preset threshold value, and drying the array substrate and the color film substrate in the vacuum—⟩using the LC ODF process for the color film substrate—⟩attaching the two substrates in the vacuum—⟩solidifying the frame glue by ultraviolet—⟩thermally solidifying the frame glue—⟩performing the optical alignment on the LC molecules—⟩cutting the PSVA LCD panel—⟩attaching the polarizer to the surface of the PSVA LCD pane, and the like.

Production Process 8:

Cleaning the substrate—⟩coating the alignment film—⟩thermally solidifying the alignment film—⟩coating the frame glue on the edge of the array substrate—⟩spraying the active reactive monomer on the array substrate and the color film substrate—⟩checking the spraying result of the color film substrate—⟩if spraying uniformity does not reach the preset threshold value, the color film substrate is cleaned and the active reactive monomer is sprayed on the color film substrate until the spraying uniformity reaches the preset threshold value, and drying the array substrate and the color film substrate in the vacuum—⟩using the ODF process for the color film substrate—⟩attaching the two substrates in the vacuum—⟩solidifying the frame glue by ultraviolet—⟩thermally solidifying the frame glue—⟩performing the optical alignment on the LC molecules—⟩cutting the LC panel the PSVA LCD panel—⟩attaching the polarizer to the surface of the PSVA LCD pane, and the like.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A method for manufacturing a polymer sustained vertical alignment (PSVA) liquid crystal displays (LCD) panel, comprising:
   A: layering an alignment film on a substrate:
   B: thrilling an active reactive monomer layer on a surface of the alignment film;
   C: coating a liquid crystal (LC) layer on a surface of the active reactive monomer layer; and
   D: sealing the LC layer, and performing optical alignment on LC molecules of the LC laver, wherein the step B comprises: adding an active reactive monomer of the active reactive monomer layer into a solvent, coating the solvent comprising the active reactive monomer on the surface of the alignment film by a spraying method, and performing vacuum drying, wherein a range of concentration of the solvent is 50ppm-5000 ppm.

2. The method for manufacturing the PSVA LCD panel of claim 1, wherein the solvent comprises any one or two of phenyl-cyclohexane and n-butylbenzene.

3. The method for manufacturing the PSVA LCD panel of claim 1, wherein a size of droplet formed by the spraying method is less than 1um.

4. The method for manufacturing the PSVA LCD panel of claim 1, wherein the step B further comprises: checking a spraying result after coating the solvent comprising the active reactive monomer on the surface of the alignment film by the spraying method; if spraying uniformity is less than a preset threshold value, the substrate is cleaned and the solvent comprising the active reactive monomer is sprayed on the substrate until the spraying uniformity reaches the preset threshold value, and the vacuum drying is performed.

5. The method for manufacturing the PSVA LCD panel of claim 1, wherein an atmospheric pressure of the vacuum drying is in a range of 1 kPa-10 kPa, temperature of the vacuum drying is in a range of 40° C.-60° C. and time of the vacuum drying is in a range of 300 s - 1800 s.

6. The method for manufacturing the PS LCD panel of claim 1, wherein an active reactive monomer of the active reactive monomer layer is benzyl cinnamate.

7. The method for manufacturing the PSVA LCD panel of claim 1, wherein a number of the substrate is two; the step A comprises: coating the alignment film on first surfaces of the two substrates, and then thermally solidifying the alignment films, wherein the first surfaces of the two substrates are arranged face to face;

wherein the step B comprises:
- B1: coating frame glue on an edge of a display area of the first surface of any one of substrates;
- B2: spraying a solvent comprising an active reactive monomer of the active reactive monomer layer on the first surface of any one or two of substrates; and
- B3: drying the substrate having the solvent comprising the active reactive monomer in a vacuum;

wherein the step C comprises: coating the LC layer on the first surface of any one or two of substrates by an LC one drop fill (ODF) process;

wherein the step D comprises:
- D1: attaching two substrates in the vacuum;
- D2: thermally solidifying the frame glue;
- D3: performing an alignment of the active reactive monomer by using the ultraviolet light; and
- D4: cutting the substrates and forming the LCD panel.

* * * * *